US012783605B2

(12) United States Patent
Schoene et al.

(10) Patent No.: US 12,783,605 B2
(45) Date of Patent: Nov. 3, 2026

(54) METHOD, COMPUTER PROGRAM, STORAGE MEDIUM AND APPARATUS FOR CREATING A TRAINING, VALIDATION AND TEST DATASET FOR AN AI MODULE

(71) Applicant: Robert Bosch GmbH, Stuttgart (DE)

(72) Inventors: Mark Schoene, Dresden (DE); Alexandru Paul Condurache, Renningen (DE); Claudius Glaeser, Ditzingen (DE); Florian Faion, Karlsruhe (DE); Florian Drews, Renningen (DE); Jasmin Ebert, Heidelberg (DE); Lars Rosenbaum, Lahntal (DE); Michael Ulrich, Sindelfingen (DE); Rainer Stal, Sindelfingen (DE); Sebastian Muenzner, Stuttgart (DE); Thomas Gumpp, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 1029 days.

(21) Appl. No.: 17/475,500

(22) Filed: Sep. 15, 2021

(65) Prior Publication Data

US 2022/0083820 A1 Mar. 17, 2022

(30) Foreign Application Priority Data

Sep. 16, 2020 (DE) ..................... 10 2020 211 595.8

(51) Int. Cl.
*G06F 18/21* (2023.01)
*G06N 3/088* (2023.01)

(52) U.S. Cl.
CPC ........ *G06F 18/217* (2023.01); *G06F 18/2163* (2023.01); *G06N 3/088* (2013.01)

(58) Field of Classification Search
CPC ............... G06F 18/217; G06F 18/2163; G06F 18/2155; G06N 3/088; G06N 3/044;
(Continued)

(56) References Cited

U.S. PATENT DOCUMENTS

| | | | | |
|---|---|---|---|---|
| 2003/0014377 | A1* | 1/2003 | Barson | H04M 3/533 706/20 |
| 2017/0249763 | A1* | 8/2017 | Garvey | G06T 11/206 |

(Continued)

FOREIGN PATENT DOCUMENTS

| | | | |
|---|---|---|---|
| CN | 107392307 | A | 11/2017 |
| CN | 108292296 | A | 7/2018 |

OTHER PUBLICATIONS

Angelov, Aleksandar, et al. "Practical classification of different moving targets using automotive radar and deep neural networks." (2018). (Year: 2018).*

(Continued)

*Primary Examiner* — Michael J Huntley
*Assistant Examiner* — Vincent Anton Spraul
(74) *Attorney, Agent, or Firm* — Maginot, Moore & Beck LLP

(57) ABSTRACT

A method for creating a training dataset, a validation dataset, and/or a test dataset for an AI module from measurement data includes dividing the measurement data into divided portions based on time periods, applying a mathematical function to the divided portions of the measurement data in order to obtain signatures representing the divided portions, determining a measure of a frequency of occurrence of a respective signature of the obtained signatures, and creating the training dataset, the validation dataset, and/or the test dataset from the measurement data based on the determined measure of the frequency.

7 Claims, 2 Drawing Sheets

(58) Field of Classification Search
CPC ...... G06N 3/045; G06N 20/00; G06V 10/774; G06V 10/776; G06V 20/56
USPC .......................................................... 706/15
See application file for complete search history.

(56) References Cited

U.S. PATENT DOCUMENTS

| | | | | |
|---|---|---|---|---|
| 2019/0379589 | A1* | 12/2019 | Ryan | G06F 17/142 |
| 2022/0068051 | A1* | 3/2022 | Krishnamurthy | G05B 23/0283 |
| 2022/0153276 | A1* | 5/2022 | Steyer | B60W 40/04 |

OTHER PUBLICATIONS

Aminikhanghahi et al., "A Survey of Methods for Time Series Change Point Detection," 2017, Knowl Inf Syst. May 2017 ; 51(2): 339-367. doi:10.1007/s10115-016-0987-z (Year: 2017).*

Johnson, J. M. et al., "Survey on Deep Learning with Class Imbalance," Journal of Big Data, 2019, vol. 6, No. 27 (54 pages).

* cited by examiner

METHOD, COMPUTER PROGRAM, STORAGE MEDIUM AND APPARATUS FOR CREATING A TRAINING, VALIDATION AND TEST DATASET FOR AN AI MODULE

This application claims priority under 35 U.S.C. § 119 to patent application no. DE 10 2020 211 595.8, filed on Sep. 16, 2020 in Germany, the disclosure of which is incorporated herein by reference in its entirety.

A first aspect of the disclosure relates to a method for creating a training, validation and test dataset for an AI module. Further aspects of the disclosure relate to corresponding computer programs, storage media, apparatuses and AI modules.

BACKGROUND

When picking up measurement data, for example by means of surroundings sensors of a vehicle in road traffic, there are various types of scenes. These are, by nature, not evenly distributed and lead to unbalanced datasets. By way of example, rear views of vehicles traveling ahead are represented more frequently than other scenes. This leads to frequent scenes being overweighted during statistical evaluation, for example by learning systems. This is manifested in non-generalizing behaviour by the learning system, for example a learning regression system, in particular for rarely occurring scenes. As a result, the quality of the outputs from such systems on these scenes is limited.

Johnson, J. M. & Khoshgoftaar, T. M. J Big Data (2019) 6: 27, discloses approaches for handling labelled, unbalanced class data. These include the following sampling techniques, inter alia: oversampling of underrepresented classes (oversample minority class), undersampling of overrepresented classes (undersample majority class), generation of synthetic examples of the underrepresented classes, and consideration of the class distribution in the error and evaluation function (overrepresentative penalization for errors based on underrepresented classes).

SUMMARY

AI modules for controlling a technical system are typically trained by means of a dataset that derives from recorded measurement data for the technical system. These measurement data are typically unbalanced. In the present case, unbalanced can be understood to mean: if for example the measurement data result from measurements during a real application of the technical system then typical instances of application of the technical system are measured more frequently than marginal cases (corner cases). Accordingly, typical instances of application are represented more frequently in the measurement data than marginal cases.

It is therefore an object of the present invention to achieve the creation of a balanced training, validation and test dataset from measurement data, for example time series measurement data, without scene labels, among other things with the aim of balancing and dividing the training, validation and/or test dataset for an AI module, for example a learning system or a regression system. The method is also able to ensure that the distribution of the time series measurement data is approximately uniform. The present invention can achieve greater generalization capability and a higher level of performance for the AI module trained by means of the created dataset, in particular for marginal cases (corner cases).

Against this background, a first aspect of the disclosure provides a method for creating a training, validation and/or test dataset for training an AI module. To this end, the method has the following steps:

Dividing the measurement data. In the case of measurement data that are not correlated in time, said measurement data can be divided on the basis of the nature of the data or the target application of the AI module. In the case of measurement data that are correlated in time, said measurement data can be divided into time periods.

The measurement data can be time series measurement data, such as for example the data from a vehicle sensor picked up over time.

Applying a mathematical function to the divided portions of the measurement data in order to obtain signatures representing the respective divided portions of the measurement data.

In the present case, a mathematical function can be understood to mean a simple representation such as for example the mean value, the standard deviation or the like. Furthermore, a mathematical function can also be understood in the present case to mean a complex function such as for example a machine learning method, such as for example an autoencoder, a principle component analysis, a recurrent artificial neural network or the like. Furthermore, a combination or series of mathematical functions can also be understood thereby.

A signature can be understood in the present case to mean a value, a pair of values or generally a tuple that represents the respective portion of the measurement data as the result of application of the mathematical functions described above to the respective portion of the measurement data.

Determining a measure of the frequency of occurrence of a respective signature.

A measure of the frequency can be understood in the case of the disclosure to mean a value, a pair of values or generally a tuple that describes how frequently a specific signature or a set of signatures arises from application of the mathematical function to the divided portions of the measurement data.

Creating a training, validation and/or test dataset from the measurement data on the basis of the determined measure of the frequency.

The AI module can be a classification system or a regression system.

According to one embodiment of the method of the disclosure, the step of dividing the measurement data involves the measurement data being divided into fixed time periods.

This embodiment has the advantage that it can ensure a uniform granularity of the captured measurement data.

According to one embodiment of the method of the disclosure, the applying step involves the mathematical function not being applied to all of the portion of the measurement data.

This embodiment has the advantage that by omitting time periods the remaining time periods to which a mathematical function is applied, and which are then used for creating the training, validation and/or test dataset, correlate less strongly in time. This provides for improved training of AI modules.

According to one embodiment of the method of the disclosure, the method is performed unsupervised. Unsupervised performance can be understood in the present case to mean performance in which the training data are not labelled or in which there are no result datasets available for the training data.

A further aspect of the disclosure is a computer program designed to perform all of the steps of the method according to the disclosure.

A further aspect of the disclosure is a machine-readable storage medium on which the computer program according to one aspect of the disclosure is stored.

A further aspect of the disclosure is an apparatus designed to perform all of the steps of the method according to the disclosure.

A further aspect of the disclosure is an AI module suitable for controlling a technical system. The AI module was trained in this case using a training dataset that was created by means of a method according to the first aspect of the disclosure.

For the purposes of the disclosure, the technical system can be a robot, a vehicle, a tool or a machine tool, inter alia.

According to one embodiment of the AI module according to the disclosure, the AI module is trained on the basis of the determined measure of the frequency.

This embodiment is based on the insight that a training method for an AI module can be improved by means of a training dataset created using the method of the disclosure if the information obtained about the measurement data, therefore the measure of the frequencies of the respective signatures in the measurement data, is used for controlling the training method.

This can be effected for example such that training is initially performed by means of a dataset balanced according to the disclosure and the training dataset continually reverts to the originally measured distribution of the measurement data over the course of the training.

This control of the training method based on the information obtained over the course of the creation of the training dataset using the method of the disclosure has the advantage that a balanced dataset is used at the beginning of the training whereas a realistic dataset is used at the conclusion of the training.

As such, optimized datasets can be used at the beginning, that is to say at the time at which the learning steps are large, and realistic datasets can be used at the conclusion, when the learning steps are smaller and marginal cases (corner cases) have a lesser influence on the overall performance of the AI module.

This leads to a more balanced AI module being obtained on the whole.

BRIEF DESCRIPTION OF THE DRAWINGS

Embodiments of the disclosure are explained in more detail below with reference to drawings, in which.

DETAILED DESCRIPTION

Figure 1:
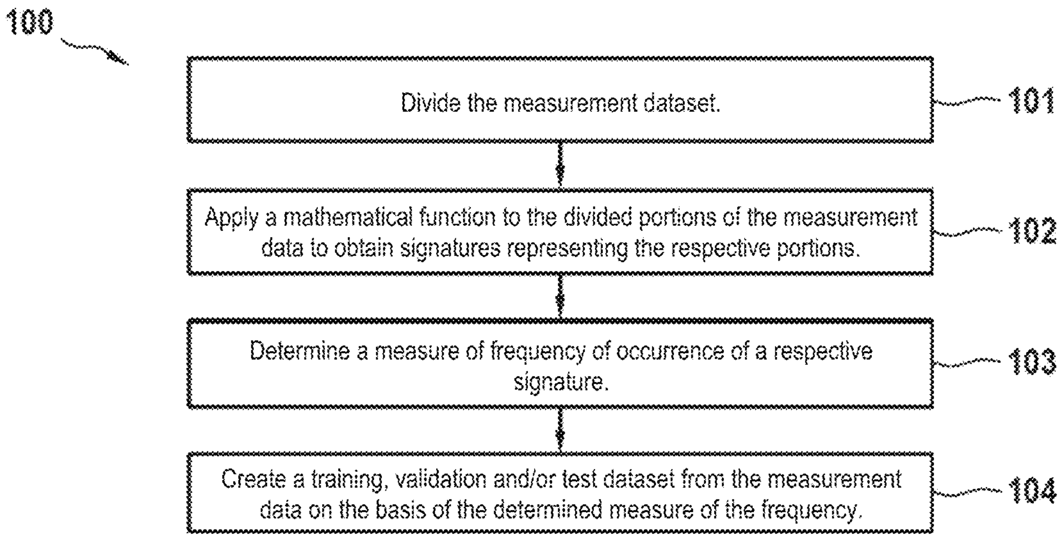
FIG. 1 shows a flowchart for an embodiment of the training method according to the disclosure.

FIG. 1 shows a flowchart for an embodiment of the method 100 for creating a training, validation and/or test dataset for an AI module according to the disclosure.

In step 101, the measurement dataset is divided. A suitable division can be depending on the nature of the measurement data. In the case of measurement data that are correlated in time, such as time series measurement data, said measurement data can be divided into suitable time periods. If necessary into fixed time periods. If for example the measurement data are measurement data from surroundings sensors of a vehicle that for example represent the orientation and the azimuth angle of an object ahead, for example a vehicle, then a time step of $\Delta t=5$ s may be suitable.

In step 102, a mathematical function is applied to the divided portions of the measurement data in order to obtain signatures representing the respective portions.

In the present case, a mathematical function can be understood to mean a simple representation such as for example the mean value, the standard deviation or the like. Furthermore, can also be understood in the present case to mean a complex function such as for example a machine learning method, such as for example an autoencoder, a principle component analysis, a recurrent artificial neural network or the like. Furthermore, a combination or series of individual mathematical functions can also be understood thereby.

A signature can be understood in the present case to mean a value, a pair of values or generally a tuple that represents the respective portion of the measurement data as the result of application of a mathematical function according to the present to the respective portion of the measurement data.

In step 103, a measure of frequency of occurrence of a respective signature is determined. A measure of the frequency can be understood in the case of the disclosure to mean a value, a pair of values or generally a tuple that describes how frequently a specific signature or a set of signatures arises from application of the mathematical function to the divided portions of the measurement data.

In step 104, a training, validation and/or test dataset is created from the measurement data on the basis of the determined measure of the frequency.

A training, validation and/or test dataset can be created from the additional information reproduced in the signatures ascertained for the respective portions of the measurement data in various ways.

One possibility can provide for the determined measure of the frequency to be taken as a basis for selecting from the measurement data a subset for a balanced training, validation and/or test dataset for an AI module (re-sampling).

A further possibility can provide for underrepresented portions of the measurement data, i.e. portions whose signatures occur less often according to the ascertained measure of the frequency, to be repeatedly selected for the creation of a training, validation and/or test dataset.

A further possibility can provide for training, validation and/or test data to be generated for underrepresented portions of the measurement data artificially. This can involve machine learning methods, such as for example generative adversarial networks (GAN), variational autoencoders and the like, being used for generating artificial data. It would also be conceivable to use classical methods for physical modelling, for example ray tracing techniques.

A further possibility can provide for the underrepresented time periods to be supported by data augmentation. Data augmentation is understood to mean the artificial changing of the input data using artificial noise and other plausible changes. These need to remain physically plausible and move the input data point minimally in space.

A further possibility can provide for overrepresented portions of the measurement data to be taken into consideration to a lesser extent. This can be accomplished for example by shortening overrepresented time periods for the creation of the training, validation and/or test dataset from the measurement dataset. It would also be conceivable take place as a result of the smaller selection of overrepresented time periods for the creation of the training, validation and/or test dataset. It would moreover be conceivable for the likelihood of selection of an overrepresented time period for the creation of the training, validation and/or test dataset to be made inversely proportional to the measure of the frequency.

Furthermore, it is conceivable for measurement data that relate to the underrepresented time periods to a particular degree to continue to be captured in order to reinforce the occurrence thereof. The continued capture of measurement data can be effected in this case by exposing the applicable sensors to measurement environments that promote capture the underrepresented time period. If for example it becomes clear that the underrepresented time periods involve specific situations in the field of the at least partially automated operation of a vehicle, then appropriately equipped measurement vehicles could be exposed to the applicable situations in order to generate data that correspond to the underrepresented time periods.

Figure 2A:
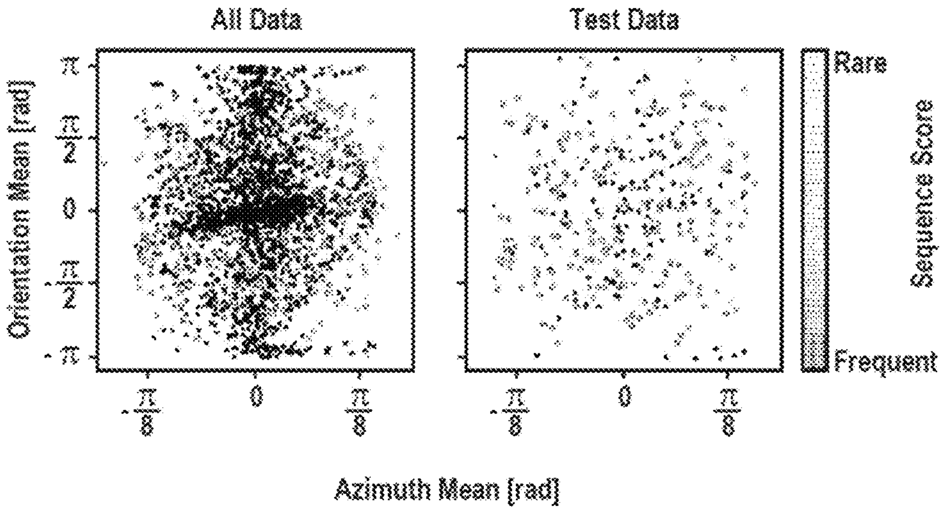
FIGS. 2*a* and 2*b* show representations of a measurement dataset and a training dataset resulting therefrom.
Figure 2B:
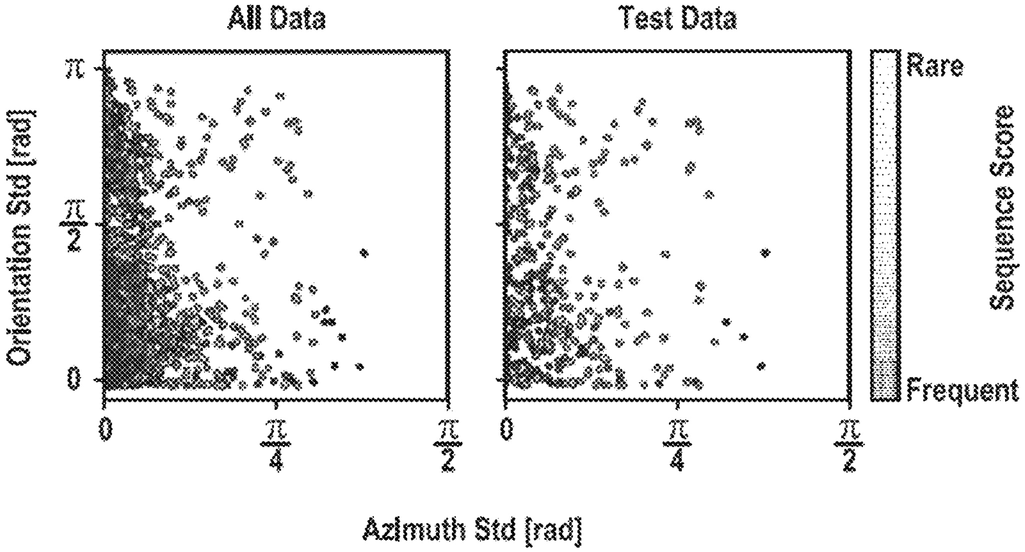

FIGS. 2*a* and 2*b* show a representation of the frequency of occurrence of a signature in an illustrative measurement dataset or in a training, validation and/or test dataset created from the measurement dataset by means of the method of the disclosure.

Measurement data correlated in time from surroundings sensors, in the present case a radar sensor and a DGPS, were used. These data were divided into time periods. A signature was calculated for each time period, in the present case the mean, depicted in FIG. 2*a*, and the standard deviation (Std), depicted in FIG. 2*b*, of the orientation and the azimuth angle. The occurrence of a respective signature was counted. The number counted for a signature is represented by means of the intensity of the grayscale value.

The left-hand graph shows the distribution of all of the measurement data. This is an unbalanced dataset owing to the nature of the data. Following application of the method of the disclosure, an approximately balanced training, validation and/or test dataset is available. The balancing of the training, validation and/or test dataset was achieved in the present case by means of the sequential importance resampling. The application of the method of the disclosure has reduced the number of very frequently occurring signatures in the training, validation and/or test dataset. This can be seen from the thinning of the data points in the middle of the right-hand graph in FIG. 2*a* and at the left-hand edge of the right-hand graph in FIG. 2*b*, inter alia.

What is claimed is:

1. A method for training an AI module, the AI module including at least one machine learning model that is configured to, when executed by a processor, control a vehicle system, the method comprising:

receiving measurement data that have been measured by at least one sensor of at least one vehicle, the measurement data being time series data describing an orientation and an azimuth angle of an object in a surroundings of the at least one vehicle;

dividing the measurement data into divided portions corresponding to respective time periods;

applying a mathematical function to the divided portions of the measurement data in order to obtain a plurality of signatures representing the divided portions, each respective signature including a set of values calculated by the applying the mathematical function to a respective one of the divided portions, the mathematical function calculating at least one of a mean and a standard deviation;

determining a frequency of occurrence of each different set of values for signatures in the plurality of signatures;

forming a training dataset from the divided portions of the measurement data that has a balanced distribution of sets of values for the signatures in the plurality of signatures based on the frequency of occurrence of each different set of values in the plurality of signatures;

training, using the training dataset, the AI module to control the vehicle system based on further measurement data; and operating the vehicle system using the trained AI module.

2. The method according to claim 1, wherein:

dividing the measurement data includes dividing the measurement data into fixed time periods.

3. The method according to claim 1, wherein the mathematical function is not applied to all of the divided portions.

4. The method according to claim 1, further comprising:

performing the method unsupervised.

5. The method according to claim 1, wherein a processor executes instructions of a computer program to perform the method.

6. The method according to claim 5, wherein the computer program is stored on a non-transitory machine-readable storage medium.

7. The method according to claim 1, wherein an apparatus having a processor is configured to perform the method.

* * * * *